United States Patent [19]

Abe et al.

[11] Patent Number: 5,469,498
[45] Date of Patent: Nov. 21, 1995

[54] POST-DELIVERY SUPPORT SYSTEM FOR PRIVATE BRANCH EXCHANGES

[75] Inventors: Toshiaki Abe; Nobukatsu Wakabayashi, both of Kawasaki, Japan

[73] Assignee: Fujitsu Limited, Kanagawa, Japan

[21] Appl. No.: 187,101

[22] Filed: Jan. 25, 1994

[30] Foreign Application Priority Data

Jan. 27, 1993 [JP] Japan .................................... 5-011258

[51] Int. Cl.⁶ .......................... H04M 15/00; H04M 3/42; G06F 15/00; G06F 15/20
[52] U.S. Cl. .......................... 379/127; 379/219; 379/225; 364/402; 364/403
[58] Field of Search .................................... 379/127, 142, 379/225, 219; 364/402, 403

[56] References Cited

U.S. PATENT DOCUMENTS

| | | | |
|---|---|---|---|
| 4,887,208 | 12/1989 | Schneider | 364/403 |
| 4,972,318 | 11/1990 | Brown | 364/403 |
| 5,038,283 | 8/1991 | Caveney | 364/403 |
| 5,117,096 | 5/1992 | Bauer | 364/403 |
| 5,128,861 | 7/1992 | Kagami | 364/403 |
| 5,216,593 | 6/1993 | Dietrich | 364/402 |
| 5,287,267 | 2/1994 | Jayaraman | 364/403 |
| 5,289,372 | 2/1994 | Guthrie | 364/403 |
| 5,295,066 | 3/1994 | Aoki | 364/402 |
| 5,305,199 | 4/1994 | LoBiondo | 364/403 |

*Primary Examiner*—Stephen Chin
*Assistant Examiner*—Paul Loomis

[57] ABSTRACT

A post-delivery support system for private branch exchanges, which permits a customer support department to provide post-delivery support to delivered private branch exchanges includes an automatic notifying unit which is arranged in a private branch exchange and automatically notifies identification information of a private branch exchange, stored in an identification information storage unit and clue information providing a clue to tracing a recipient to whom the private branch exchange is delivered, to the customer support department via a public line. The notification is carried out when system software is initialized at the time of installation of the private branch exchange. The clue information is, for example, a telephone number of the recipient of the private branch exchange. A shipment information storage unit, provided at the customer support department, previously stores the identification information and component parts information of the private branch exchange when the private branch exchange is shipped. A linking unit links the identification information and the component parts information stored in the shipment information storage unit, to the identification information and the clue information notified by the automatic notifying unit, to organize a database.

8 Claims, 9 Drawing Sheets

COMPONENT : E20B-4041-R700    COMPONENT : 05B
SPEC.                         VER.

NO. OF
                                              CUSTOMERS : 12

| NAME | ADDRESS | SERIAL NO. | SHIPPED | IN-STALLED |
|------|---------|------------|---------|-----------|
| A A A | a a a | 203363 | 920121 | 920317 |
| B B B | b b b | 204478 | 920406 | 920615 |
| C C C | c c c | 203923 | 920317 | 920520 |
| . | . | 204461 | 920604 | 920803 |
| . | . | 204351 | 920219 | 920405 |
| . | . | 205372 | 920523 | 920720 |
| . | . | 203056 | 920417 | 920610 |
| . | . | 203253 | 920425 | 920620 |
| . | . | 205102 | 920216 | 920421 |
| . | . | 204253 | 920402 | 920618 |
| . | . | 203783 | 920316 | 920511 |
| L L L | l l l | 205384 | 920404 | 920605 |

FIG. 9

POST-DELIVERY SUPPORT SYSTEM FOR PRIVATE BRANCH EXCHANGES

BACKGROUND OF THE INVENTION (1) Field of the Invention

The present invention relates to a post-delivery support system for private branch exchanges designed for the use of small-scale custom as telephone switchboards, and more particularly, to a post-delivery support system which permits a customer support section to support the private branch exchanges which have been delivered.

(2) Description of the Related Art

A field support department of a factory usually keeps at hand the information about the names and addresses of customers to whom private branch exchanges (PBX) for the use of small-scale trade have been delivered, the configuration of hardware and software of the private branch exchanges at the time of shipment, and like information, considering that a fault occurred in the hardware or software of a certain private branch exchange can occur in other private branch exchanges of the same configuration which have been already delivered. The private branch exchange referred to herein is a telephone switchboard capable of connecting approximately up to 100 extension lines, and it is assumed that the field support department is to manage approximately 100,000 customers to whom private branch exchanges have been delivered.

Generally, private branch exchanges shipped from a factory 101 are kept in a warehouse 102, and then sold to customers 104 by dealers 103, as shown in FIG. 1.

The information necessary for the field support department of the factory 101 includes the names and addresses of customers to whom private branch exchanges have been delivered, identification numbers identifying the individual private branch exchanges, identification numbers identifying the software installed in the private branch exchanges, identification numbers identifying the component parts constituting the private branch exchanges, etc. Among these, the information already known at the time of shipment from the factory 101 includes the identification numbers of private branch exchanges and the identification numbers of the software and component parts, and the names and addresses of customers to whom private branch exchanges are to be delivered are usually not known.

Conventionally, to obtain information about the names and addresses of customers to whom private branch exchanges are delivered, the following measures are taken: At the factory 101, each private branch exchange is packed together with a reply postcard 105 called customer card, on which the identification number of the private branch exchange is printed, so that the customer who received the private branch exchange may write the name and address on the postcard and return it to the factory 101.

Usually, however, the recovery rate of such reply postcards 105 is 30% or less, making it difficult to provide adequate post-delivery support to the delivered private branch exchanges.

SUMMARY OF THE INVENTION

An object of the present invention is to provide a post-delivery support system for private branch exchanges, which ensures acquisition of information about recipients of private branch exchanges, thereby making it possible to provide appropriate post-delivery support.

To achieve the above object, there is provided a post-delivery support system for private branch exchanges, which permits a customer support department to provide post-delivery support to delivered private branch exchanges. The post-delivery support system comprises identification information storage means arranged in a private branch exchange, for storing identification information of the private branch exchanged and automatic notifying means arranged in the private branch exchange, for automatically notifying the identification information stored in the identification information storage means, and clue information providing a clue to tracing a recipient to whom the private branch exchange is delivered, to the customer support department via a public line.

The post-delivery support system further comprises shipment information storage means provided at the customer support department, for storing the identification information and component parts information of the private branch exchange when the private branch exchange is shipped, and linking means provided at the customer support department, for linking the identification information and the component parts information stored in the shipment information storage means, to the identification information and the clue information notified by the automatic notifying means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a chart showing an example of an output list.

DESCRIPTION OF THE PREFERRED EMBODIMENTS

An embodiment according to the present invention will be outlined first.

Figure 1:
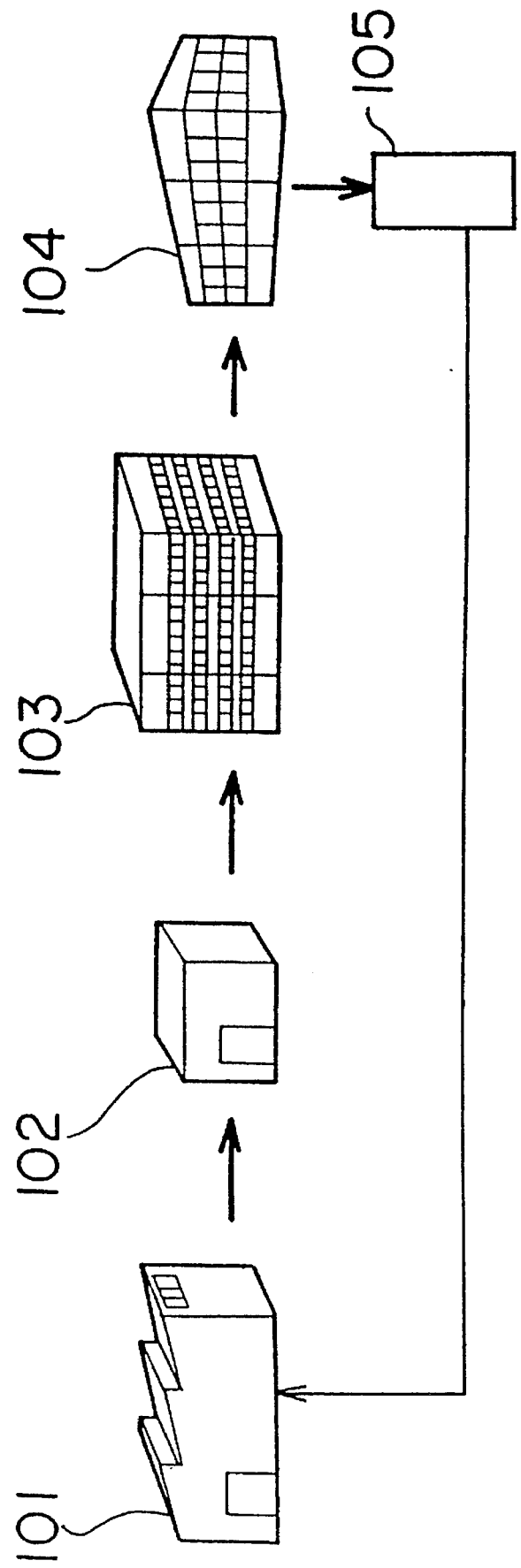
FIG. 1 is a diagram illustrating a conventional method of obtaining customer information.
Figure 2:
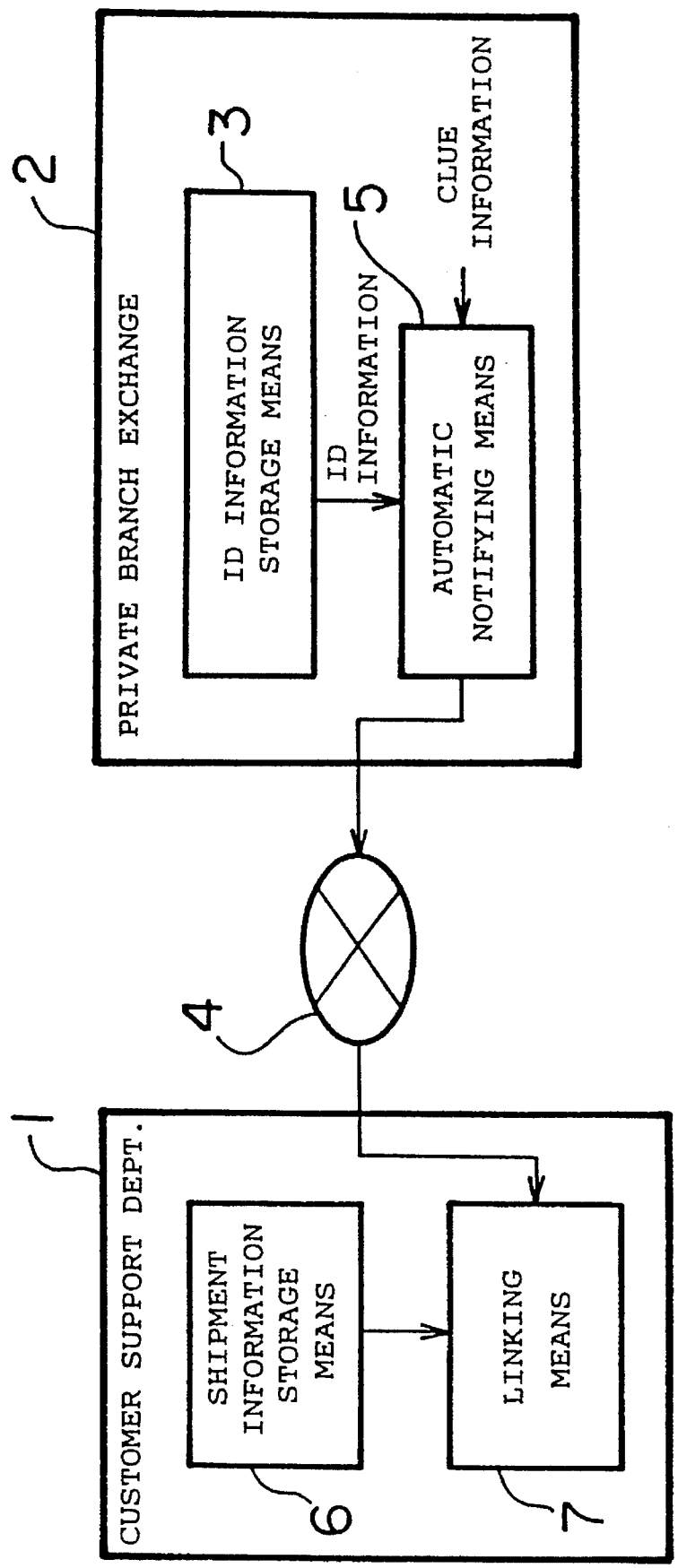
FIG. 2 is a diagram illustrating an outline of an embodiment according to the present invention.

Referring to FIG. 2, a post-delivery support system for private branch exchanges according to the embodiment of the invention generally comprises identification information storage means 3 and automatic notifying means 5, both arranged in a private branch exchange 2. The identification information storage means 3 stores information identifying the private branch exchange 2, and the automatic notifying means 5 automatically notifies the identification information stored in the storage means 3, and clue information providing a clue or lead to tracing a recipient of the private branch exchange 2, to a customer support department 1 through a public line 4.

The post-delivery support system further comprises shipment information storage means 6 and linking means 7, both arranged on the side of the customer support department 1. The shipment information storage means 6 stores the identification information and component parts information of the private branch exchange 2 at the time of shipment, and the linking means 7 links the identification information and component parts information stored in the shipment information storage means 6, to the identification information and clue information supplied from the automatic notifying means 5.

With the arrangement described above (FIG. 2), the automatic notifying means 5 in the private branch exchange 2 automatically notifies the identification information of the private branch exchange 2, stored in the storage means 3, and the clue information providing a clue to tracing the recipient of the private branch exchange 2, to the customer support department 1 via the public line 4. This notification is carried out by means of a push-button signal transmitting means arranged in the private branch exchange 2 when system software is initialized at the time of installation of the private branch exchange 2. The clue information includes, e.g., the telephone number of the recipient of the private branch exchange 2.

Thus, the customer support department 1 can reliably obtain information about the recipient of the private branch exchange.

The identification information and component parts information of the private branch exchange 2 are previously stored in the shipment information storage means 6 of the customer support department 1 when the private branch exchange 2 is shipped. The linking means 7 links the identification information and component parts information stored in the shipment information storage means 6, to the identification information and clue information supplied from the automatic notifying means 5, to thereby allow a recipient list or the like to be output, for example, a list of the recipients to whom private branch exchanges including a certain component part have been delivered. Since various types of lists and the like can be output, appropriate post-delivery support can be implemented.

The embodiment of the present invention will be now described in more detail.

Figure 3:
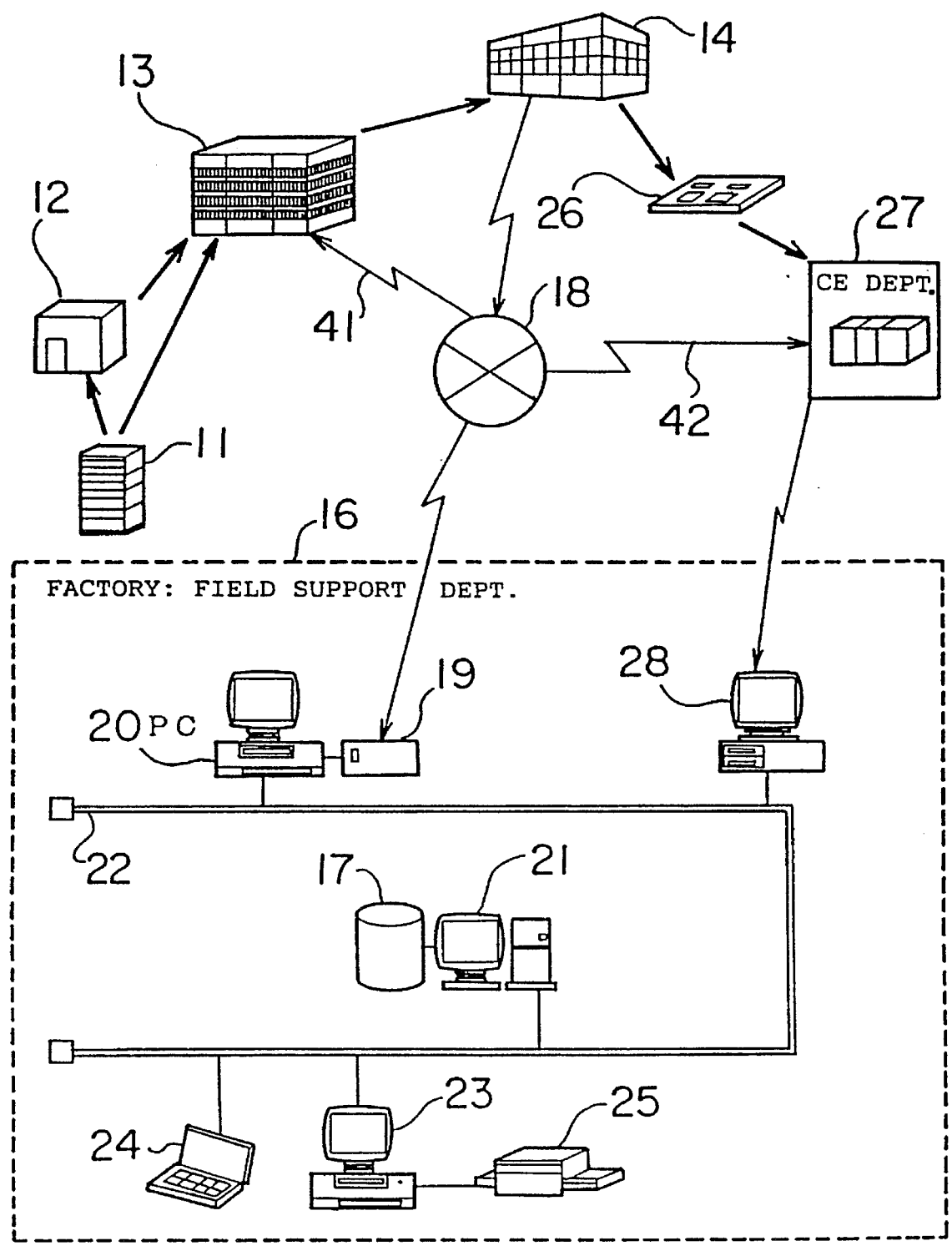
FIG. 3 is a diagram of an entire configuration including a post-delivery support system for private branch exchanges.

FIG. 3 is a diagram illustrating an entire configuration including the post-delivery support system for private branch exchanges according to the present invention. When each of private branch exchanges 11 is manufactured, identification information peculiar thereto is previously stored in a built-in ROM. The identification information is composed of "system type" which is a three-digit number indicating the model of the private branch exchange 11, a "serial number" which is a six-digit number used for the individual identification of the private branch exchange 11, and "software ID" which is a nine-digit number indicating the identification code and version number of system software installed in the private branch exchange 11. Thus, the identification information is made up of a series of numbers.

The private branch exchange 11 is shipped to a dealer 13 directly or via a warehouse 12 and then sold to a customer 14. At the time of shipment, shipment information is stored in a file server 17 arranged at a field support department 16 of a factory. The shipment information includes the serial number of the private branch exchange 11, and a number representing the types of component parts constituting the private branch exchange 11.

The private branch exchange installed at the customer 14 requires, first of all, initialization (IPL; initial program loading) of the system software in accordance with an initialization program. The initialization program previously includes a step of requesting entry of the telephone number of the customer 14 (customer phone number), and a step of automatically transmitting the customer phone number etc.

Namely, entry of the telephone number is requested in the customer phone number entry step, and the customer phone number entered is stored in a RAM of the private branch exchange. Then, in the automatic transmission step, the private branch exchange transmits the identification information stored in the ROM, and the customer phone number stored in the RAM, to a receiver 19 provided at the field support department 16 via a public line 18.

The receiver 19 sends the received identification information and customer phone number to a personal computer (hereinafter referred to as "PC") 20, which then sends the received data to a workstation (hereinafter referred to as "WS") 21 via a LAN 22. The WS 21 stores the received data in the file server 17. The WS 21 and the file server 17 organize a relational database based on shipment database files, customer database files, fault database files, etc., described later, and allow eight personal computers 23 and 24 to retrieve data from the database. FIG. 3 shows only two of the eight personal computers. For example, the personal computer 23 is associated with a laser printer 25, and the personal computer 24 is a notebook type.

In the event the private branch exchange delivered to a customer has developed a fault, for example, if a printed circuit board (PCB) 26 in the private branch exchange has a fault, fault information is transmitted from a customer engineering department (CE department) 27 to a personal computer (hereinafter referred to as "PC") 28 at the field support department 16 through an internal (in-house) private line. The transmitted fault information includes a number indicating the faulty component part and details of the fault. The fault information is stored in the file server 17 via the LAN 22 and the WS 21.

Figure 4:
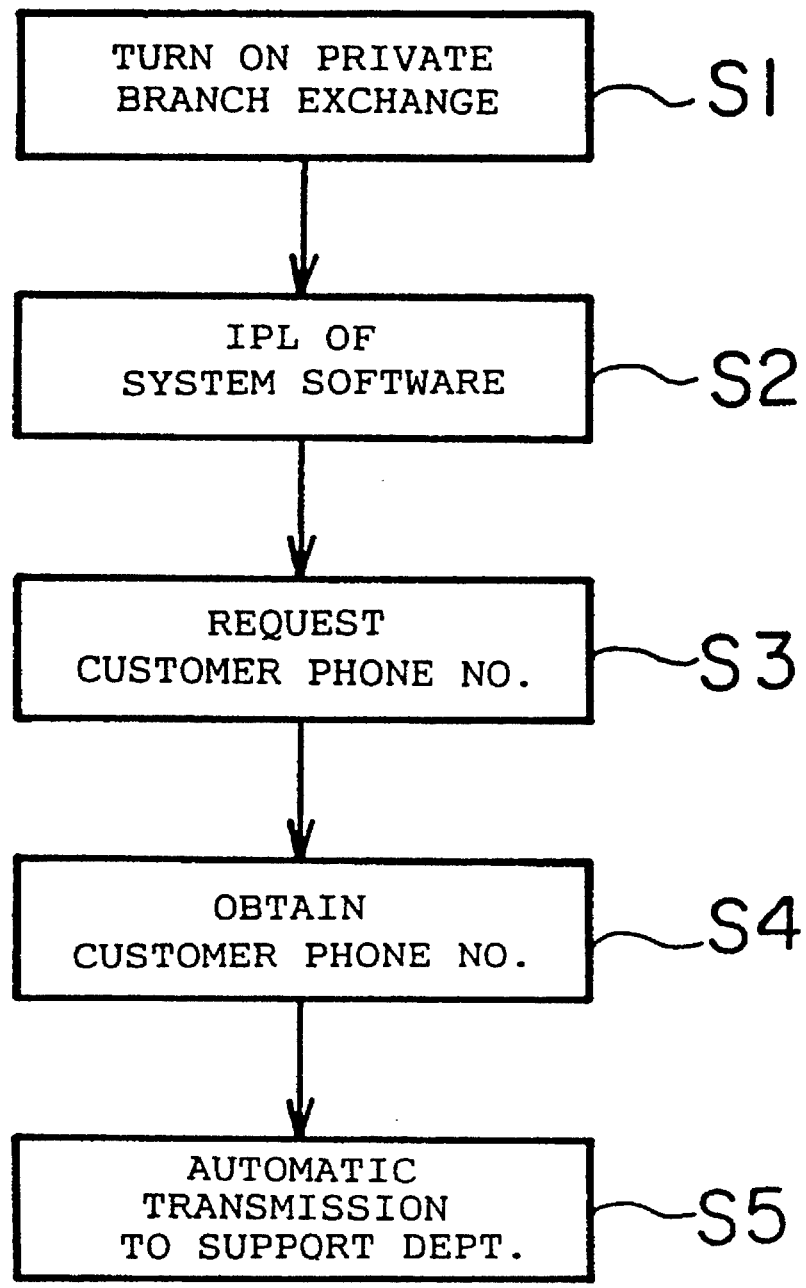
FIG. 4 is a flow chart of an automatic transmission process executed at the time of initialization of a private branch exchange delivered to a customer.

FIG. 4 is a flow chart of an automatic transmission process executed at the time of initialization of the private branch exchange after delivery to the customer 14. In the chart, numbers following "S" denote step numbers.

[S1] The private branch exchange is turned on and the system software is started.

[S2] The initialization (IPL) of the system software is started, whereby the initialization program is executed.

[S3] In the process of the initialization, entry of the customer phone number is requested.

[S4] When the customer phone number is entered, it is stored in the RAM of the private branch exchange.

[S5] In accordance with the initialization program, the private branch exchange transmits the identification information stored in the ROM, and the customer phone number stored in the RAM, to the receiver 19 at the field support department 16 through the public line 18.

Figure 5:
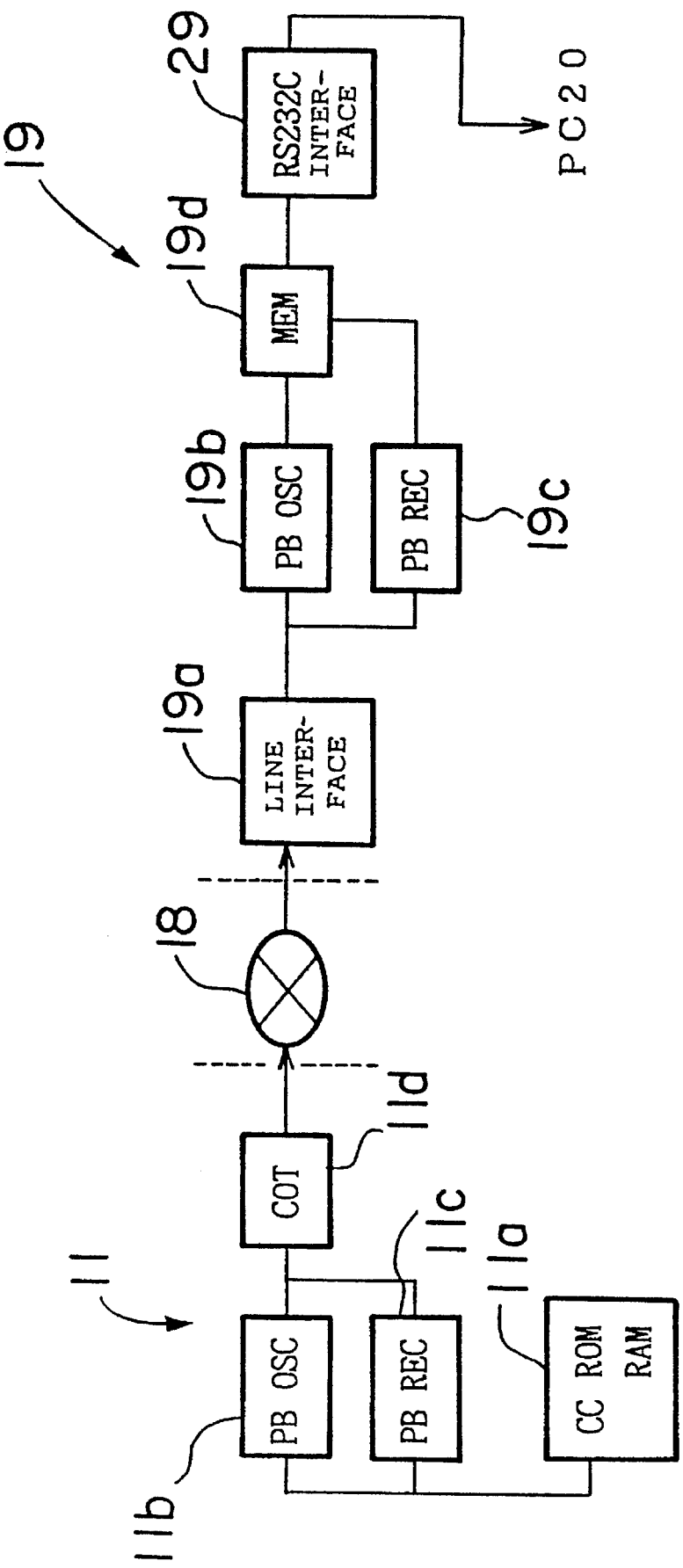
FIG. 5 is a block diagram showing the internal arrangement of the private branch exchange and a receiver.

FIG. 5 is a block diagram showing the internal arrangement of the private branch exchange 11 and receiver 19, and illustrates, in particular, the configuration necessary to achieve the automatic transmission of the identification information and customer phone number at the time of the initialization. A central control unit (CC) 11a controls the automatic transmission at the time of the initialization, and includes therein a ROM storing the identification information, and a RAM for storing the customer phone number. When the system software is initialized, the central control unit 11a reads the identification information and the customer phone number stored in the ROM and the RAM, respectively, and transmits the data to the receiver 19 at the field support department 16 through a PB signal oscillator (PBOSC) 11b, a central office trunk (COT) 11d, and the public line 18. The PB signal oscillator 11b converts a "0,1"-coded signal into a push-button signal, and thus converts the identification information and the customer phone number into corresponding push-button signals. A PB signal receiver (PBREC) 11c, which is not used during signal transmission, converts a push-button signal into a "0,1"-coded signal. The central office trunk 11d serves to detect and transmit various line signals, such as a call-out signal, call-in signal, answer signal, ring-off signal, etc.

The initialization program is prepared such that the signal transmission from the private branch exchange 11 to the field support department 16 is carried out via an enterprise number (toll-free number). Thus, the customer is not charged for the automatic transmission. Further, since the identification information and the customer phone number are composed of a series of numbers, they can be transmitted by using the push-button signal transmitting function that the private branch exchange 11 inherently has, without the need to use a modem or the like.

In the receiver 19 at the field support department 16, communications with the private branch exchange 11 are established through a line interface 19a. The received push-button signal is converted into a "0,1"-coded signal by a PB signal receiver (PBREC) 19c, to obtain the identification information and the customer phone number, which data are then stored in a buffer memory (MEM) 19d. A PB signal oscillator 19b, which is not used during signal reception, serves to convert a "0,1"-coded signal into a push-button signal.

The receiver 19 transfers the identification information and customer phone numbers, transmitted from newly installed private branch exchanges and stored in the buffer memory 19d, to the PC 20 via an RS-232-C interface 29, at regular intervals of time (e.g., every 24 hours) or when the storage capacity of the buffer memory 19d is reached. The data transfer is carried out only when required, thereby permitting the PC 20 to perform other tasks.

The initialization program is designed such that, in case the private branch exchange 11 is unable to connect to the receiver 19 at the field support department 16 for transmission of the identification information and the customer phone number, it retries the connection and transmission upon lapse of 24 hours, up to five times. This can solve the problem that the field support department 16 cannot be accessed due to consecutive holidays or the like. The aforesaid measurement of 24 hours is carried out only while power is supplied to the private branch exchange 11.

Figure 6:
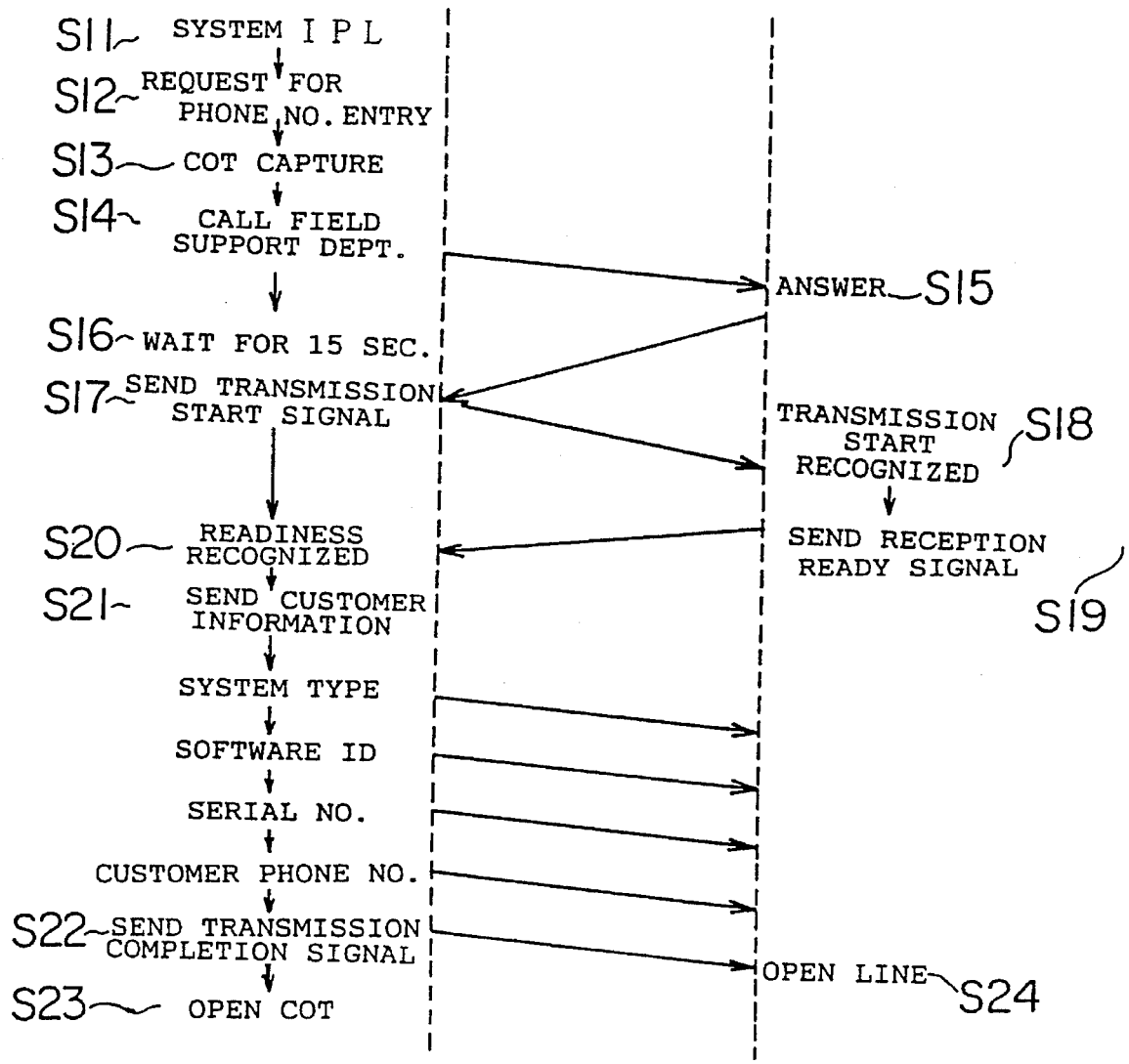
FIG. 6 is a chart illustrating a protocol for communications between the private branch exchange and the receiver.

FIG. 6 is a chart showing a protocol for communications between the private branch exchange 11 and the receiver, and illustrates, in particular, a communication protocol for achieving the automatic transmission of the identification information and customer phone number at the time of the initialization.

[S11] The initialization (IPL) of the system software is started.

[S12] The customer phone number is entered.

[S13] The destination station is captured; namely, the central office trunk 11d transmits a call-out signal.

[S14] The private branch exchange 11 calls the receiver 19 of the field support department 16 via an enterprise (toll-free) number.

[S15] The receiver 19 answers the call.

[S16] After dialing, the private branch exchange waits for an answer for 15 seconds, and if no answer is received, it cuts off the line.

[S17] If answered, the private branch exchange consecutively transmits the push-button signal "#" up to a maximum of 15 times, as a transmission start signal.

[S18] On receiving the transmission start signal, the receiver 19 prepares for signal reception.

[S19] When prepared for the signal reception, the receiver sends a reception ready signal "**" (push-button signal) to the private branch exchange 11.

[S20] On receiving the reception ready signal, the private branch exchange judges that the receiver 19 is ready for the signal reception. If readiness for the signal reception is not acknowledged, Step S13 and the subsequent steps are executed every 24 hours, up to five times, until the acknowledgment is made.

[S21] The identification information and the customer phone number are successively transmitted to the receiver 19.

Specifically, the system type, software ID, serial number, and customer phone number are successively transmitted. In this case, a control code is prefixed to each data and "pause" is put at the end of each data. Each control code comprises the push-button signal "*" followed by a number (1, 2, 3 or 4). The transmission of each signal requires 50 to 120 ms, and the transmission interval is 120 to 250 ms.

[S22] A transmission completion signal "##" is sent to the receiver 19.

[S23] A ring-off signal is transmitted and the line is cut off.

[S24] The line is made open.

Figure 7:
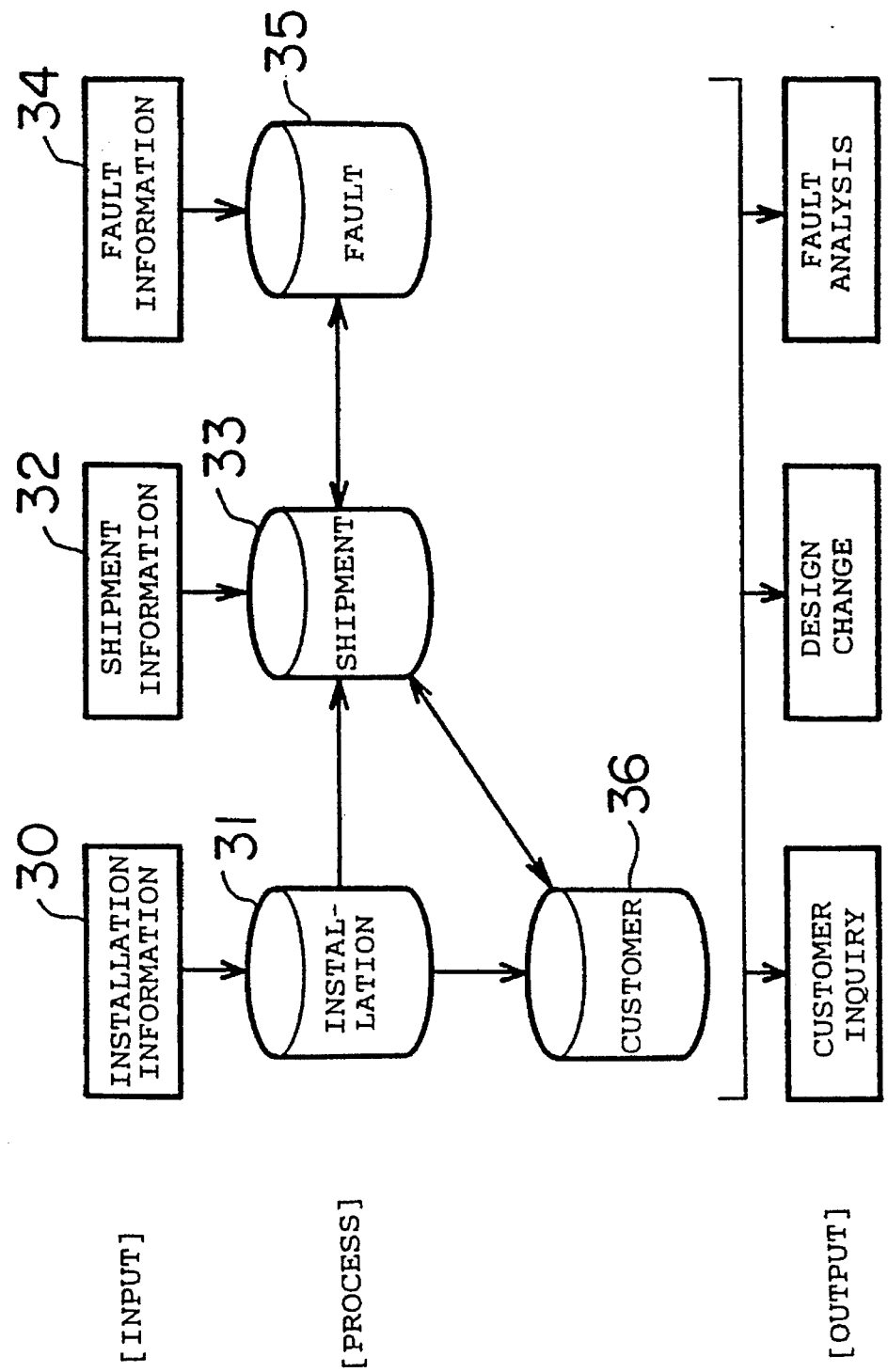
FIG. 7 is a diagram illustrating the configuration of a retrieval system.

FIG. 7 is a diagram illustrating the configuration of the retrieval system constituted by the WS 21, file server 17, and eight personal computers 23 and 24 shown in FIG. 3. The identification information (system types, software ID's, serial numbers) and customer phone numbers, which are supplied from various private branch exchanges via the receiver 19 and the PC 20, are stored as installation information 30 in an installation database 31 in the file server 17. Also, shipment information 32, i.e., the serial numbers of individual private branch exchanges 11 and the numbers indicating the component parts constituting the private branch exchanges 11, is stored in a shipment database 33 in the file server 17 when the private branch exchanges 11 are shipped from the factory. Further, fault information 34, i.e., the numbers indicating faulty component parts and details of the faults, supplied from the customer engineering department 27 via the PC 28, is stored in a fault database 35 in the file server 17.

Then, a telephone call is made to each new customer at the customer phone number stored in the installation database 31, to thereby obtain the name and address of the customer. The name and address of the customer obtained in this manner are combined with the contents of the installation database 31, thereby creating a customer database 36.

The retrieval system is based on the customer database 36, shipment database 33, and fault database 35 created as described above, and has, e.g., 24 types of relational database tables and 100 types of input/output screens or forms. Specifically, the relational database is accessible from the eight personal computers 23 and 24, thereby allowing the personal computers to make inquiries about the installation information or fault history of the individual customers from a customer inquiry database 36a, put the data to practical use for the support of design change from a customer inquiry database 36b, and perform fault analysis using a fault analysis database 36c, for example.

Figure 8:
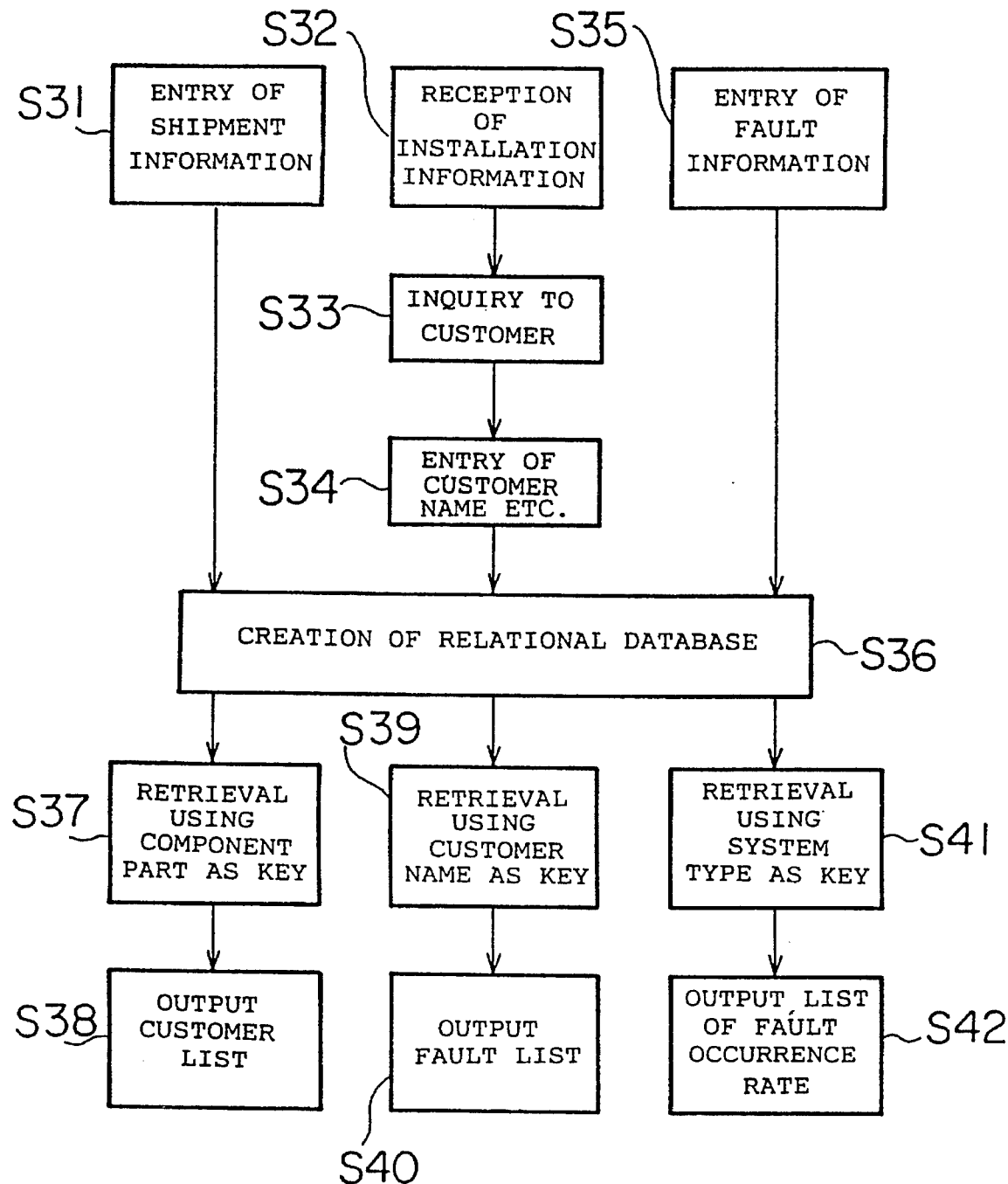
FIG. 8 is a flow chart showing a file creation process and various retrieval processes executed by the retrieval system.

FIG. 8 is a flow chart showing a file creation process and retrieval processes executed by the retrieval system.

[S31] The shipment information 32, i.e., the serial numbers of the private branch exchanges 11 and the numbers indicating the component parts forming the private branch exchanges 11, are stored in the shipment database 33 when the private branch exchanges 11 are shipped from the factory.

[S32] The identification information (system type, software ID, and serial number) and customer phone number are received from an installed private branch exchange via the receiver 19 and the PC 20, and the received data is stored in the installation database 31.

[S33] A telephone call is made to the customer at the received customer phone number, and the name and address of the customer are obtained.

[S34] The name and address of the customer thus obtained are combined with the contents of the installation database 31 to create the customer database 36.

[S35] The fault information 34 received from the customer engineering department 27 via the PC 28, that is, the numbers indicating faulty component parts and details of the faults, is stored in the fault database 35.

[S36] Based on the databases individually created as described above, a relational database is organized. Various retrieval processes can be carried out using the relational database, but only three of the retrieval processes are explained below in Steps S37 to S42, by way of example.

[S37] It is here assumed that a fault has occurred in the printed circuit board "E20B-4041-R700" and that the installed private branch exchanges containing the printed circuit board need a design change. In this case, it is necessary to learn all of the customers to whom such private branch exchanges have been delivered, and thus required data is retrieved from the relational database, using the component part as a key.

[S38] As a result of the retrieval in Step S37, a list of the names and addresses of the customers to whom the private branch exchanges containing the component part in question have been delivered is output. An example of the list is shown in FIG. 9.

The output list and information about the design change are also supplied to the dealer 13 and the customer engineering department 27 via the public line 18 and the routes 41 and 42 shown in FIG. 3.

In Step S37, data may be retrieved from the relational database by using a software ID as a key, so that a list of the customers to whom private branch exchanges installed with the particular software program have been delivered can be output, in Step S38. In this case, the output list can be used for sales activities when the software program is upgraded.

[S39] Let it be assumed that a fault is currently occurring in the private branch exchange delivered to a certain customer, and that the history of faults that this customer has encountered need be examined to find the cause of the fault. In such cases, required data can be retrieved from the relational database, using the customer's name as a key.

[S40] As a result of the retrieval in Step S39, all of the faults that have occurred in the private branch exchange delivered to this customer are output in the form of a list.

[S41] When faults need be categorized according to the models of private branch exchanges, for example, data is retrieved from the relational database, using the system type as a key.

[S42] As a result of the retrieval in Step S41, all of the faults that have occurred in the particular model of private branch exchange are output in the form of a list.

In the above embodiment, the customer is requested to input the telephone number prior to the automatic transmission by the private branch exchange, and then the telephone number is transmitted to the field support department 16. However, if a code is available which can be indicated by a push-button signal and which provides a clue to finding the customer's name, then such a code may be used in place of the customer's telephone number. Further, in cases where the use of a modem or the like is prerequisite, the customer's name may be directly transmitted.

As described above, in the automatic transmission step of the initialization program, the identification information stored in the ROM of the private branch exchange and the clue information providing a clue to tracing the recipient of the private branch exchange are automatically notified to the customer support department via a public line. Accordingly, the customer support department can reliably grasp a large number of small-scale custom to whom the private branch exchanges have been delivered.

The initialization program is designed to be executed when the system software is initialized at the time of installation of the private branch exchange; therefore, the identification information and the clue information can be reliably and easily transmitted to the customer support department when the private branch exchange is installed.

The clue information is the telephone number of the recipient to whom the private branch exchange has been delivered. Accordingly, the clue information can be transmitted to the customer support department by means of the push-button signal transmitting function that the private branch exchange inherently has, thus requiring no special device for the transmission.

Further, the file server and the workstation provided at the customer support department serve to store the identification information and component parts information of private branch exchanges at the time of shipment, and link the stored data to the information supplied thereto in accordance with the initialization program, thus making it possible to provide appropriate post-delivery support.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A post-delivery support system in combination with private branch exchanges to be delivered to recipients, the post-delivery system permitting a customer support department to provide post-delivery support to delivered private branch exchanges, the post-delivery support system comprising:

identification information storage means arranged in a private branch exchange, for storing identification information of the private branch exchange;

clue information storage means arranged in said private branch exchange and providing information about said recipients; and automatic notifying means arranged in the private branch exchange, for automatically notifying the identification information stored in the identification information storage means, and the clue information stored in the clue information storage means for providing a clue for tracing a recipient to whom the private branch exchange is delivered, to the customer support department via a public line to enable the customer support department to obtain information about said recipient.

2. The post-delivery support system according to claim 1, wherein said automatic notifying means operates when system software is initialized at the time of installation of the private branch exchange.

3. The post-delivery support system according to claim 1, wherein said clue information comprises a telephone number of the recipient of the private branch exchange.

4. The post-delivery support system according to claim 1, wherein said identification information storage means comprises a ROM arranged in the private branch exchange.

5. The post-delivery support system according to claim 1, wherein said private branch exchange includes push-button signal transmitting means, said automatic notifying means notifying the identification information and the clue information by means of a push-button signal of the push-button signal transmitting means.

6. The post-delivery support system according to claim 1, wherein said automatic notifying means includes means for automatically retrying notification to the customer support department in case of notification failure.

7. The post-delivery support system according to claim 1, which further comprises:

shipment information storage means provided at the customer support department, for storing the identification information and component parts information of the private branch exchange when the private branch exchange is shipped; and linking means provided at the customer support department, for linking the identification information and the component parts information stored in the shipment information storage means, to the identification information and the clue information notified by the automatic notifying means.

8. The post-delivery support system according to claim 7, wherein said linking means includes means for outputting a list of recipients of private branch exchanges including a particular component part.

* * * * *